United States Patent [19]

Hashizume et al.

[11] Patent Number: 5,632,247
[45] Date of Patent: May 27, 1997

[54] PREIGNITION DETECTING SYSTEM

[75] Inventors: Katsushi Hashizume; Kazuhisa Mogi, both of Susono, Japan

[73] Assignee: Toyota Jidosha Kabushiki Kaisha, Aichi, Japan

[21] Appl. No.: 620,123

[22] Filed: Mar. 21, 1996

[30]    Foreign Application Priority Data

Mar. 23, 1995  [JP]  Japan ................................. 7-064163
Oct. 16, 1995  [JP]  Japan ................................. 7-267026

[51] Int. Cl.$^6$ ...................................................... F02P 5/14
[52] U.S. Cl. ................................................................. 123/425
[58] Field of Search ..................................... 123/425, 630, 123/435, 609; 364/431.05, 431.08; 73/35.03

[56]    References Cited

U.S. PATENT DOCUMENTS

| | | | |
|---|---|---|---|
| 5,388,560 | 2/1995 | Hisaki et al. | 123/630 |
| 5,411,000 | 5/1995 | Miyashita et al. | 123/425 |
| 5,421,304 | 6/1995 | Gibtner et al. | 123/425 |
| 5,426,587 | 6/1995 | Imai et al. | 364/431.05 |

FOREIGN PATENT DOCUMENTS

| | | | |
|---|---|---|---|
| 57-32066 | 2/1982 | Japan | 123/425 |
| 62-248852 | 10/1987 | Japan | 123/425 |
| 1-88042 | 6/1989 | Japan | 123/425 |

*Primary Examiner*—Raymond A. Nelli
*Attorney, Agent, or Firm*—Oliff & Berridge

[57] ABSTRACT

A preignition detecting system capable of detecting a preigniting condition (PI) at an early time. Vibration of an internal combustion engine is detected by a vibration sensor 113, and is fetched by a controller 12. The crank angle is detected by a crank angle sensor 111. It is so determined that PI has occurred when a difference between the ignition timing and the crank angle at which the vibration level exceeds a predetermined level becomes smaller than a predetermined value. It is further determined that the PI is occurring when the vibration level continues to increase despite the ignition timing being delayed continuously, enabling the occurrence of PI to be detected quickly and reliably. Furthermore, the constitution is simplified by installing a first gate that opens after the passage of a short period of time from the ignition timing and a second gate that opens thereafter.

8 Claims, 10 Drawing Sheets

PREIGNITION DETECTING SYSTEM

BACKGROUND OF THE INVENTION

1. Field of the Invention

This invention relates to a preignition detecting system in an internal combustion engine and, more particularly, to a preignition detecting system capable of detecting a preigniting condition quickly.

2. Description of the Related Art

In an internal combustion engine, preignition is a phenomenon in which residual heat possessed by a spark plug or a deposit in a cylinder creates a hot spot causing the air-fuel mixture to be spontaneously ignited during the compression stroke. Preignition causes not only a sharp decrease in the engine output or a change in the engine revolution but also, in extreme cases, damage to the internal combustion engine.

Therefore, there has been proposed a device for controlling an internal combustion engine which so determines that preignition has occurred when vibration larger than a predetermined level is detected before ignition in each cylinder, and cuts off the supply of fuel to the cylinder (see Unexamined Japanese Utility Model Publication (Kokai) No. 1-88042).

According to the above-mentioned device for controlling the internal combustion engine which detects the occurrence of preignition when vibration larger than a predetermined level is detected before the ignition, however, it is only after the preignition has proceeded to a considerable degree that the occurrence of preignition can be detected. By that time, it is no longer possible to avoid the probability of causing damage to the internal combustion engine and, besides, drivability is deteriorated due to cut-off of the fuel supply.

SUMMARY OF THE INVENTION

The present invention was accomplished in view of the above-mentioned circumstances, and its object is to provide a preignition detecting system capable of detecting a preigniting condition quickly.

According to an aspect of the present invention, there is provided a preignition detecting system comprising:

ignition timing control means for determining an ignition timing depending upon the conditions in which an internal combustion engine is operating;

abnormal vibration determining means for so determining that abnormal vibration is occurring when a vibration component within a predetermined frequency range as a result of detecting vibration of the internal combustion engine is larger than a predetermined level or when vibration within a predetermined frequency range occurs more often than a predetermined frequency after the ignition is effected by said ignition timing control means;

abnormal vibration timing detecting means for detecting a timing at which it is determined by said abnormal vibration determining means that abnormal vibration is occurring; and a preignition determining means for so determining that preignition is occurring depending upon a time difference between the ignition timing determined by said ignition timing control means and the timing of abnormal vibration detected by said abnormal vibration timing detecting means.

The preignition detecting system determines whether the preignition is occurring or not based upon a difference between the timing at which abnormal vibration is occurring and the ignition timing.

DESCRIPTION OF THE PREFERRED EMBODIMENTS

Figure 1:
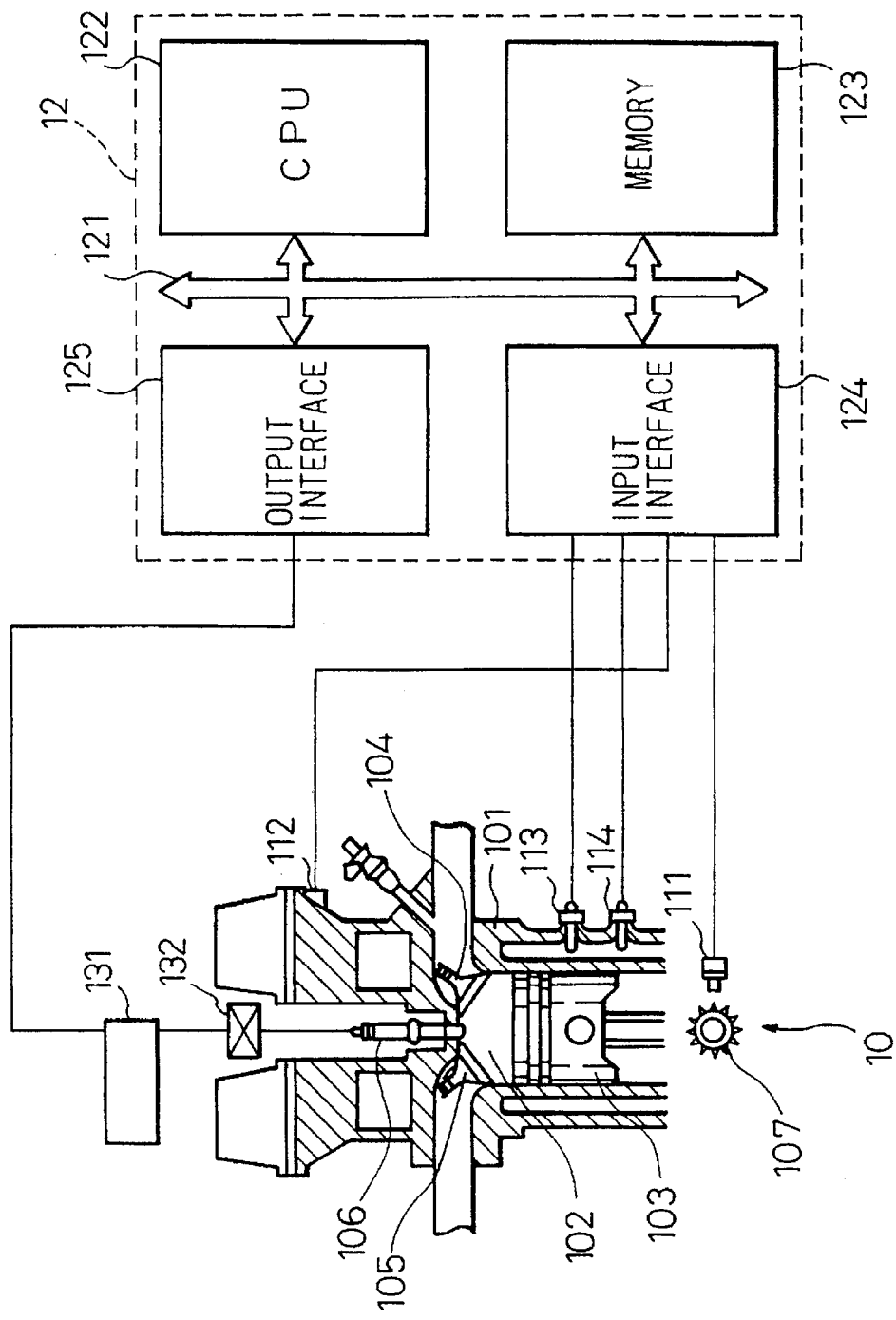
FIG. 1 is a diagram illustrating the constitution of a preignition detecting system.

FIG. 1 is a diagram illustrating the constitution of a preignition detecting system according to the present invention, wherein an internal combustion engine 10 has a piston 103 which moves up and down in a cylinder 102 formed in a cylinder block 101.

In an upper part of the cylinder 102 are arranged an intake valve 104, an exhaust valve 105 and an ignition plug 106. The air-fuel mixture supplied through the intake valve 104 is compressed and is ignited by the ignition plug 106, so that the piston 103 is pushed down to produce a driving force.

The up and down motions of the piston 103 are converted into a rotational force by a crank shaft (not shown). A timing rotor 107 is attached to the front end of the crank shaft.

The timing rotor 107 has teeth maintaining an angle of 30 degrees (a total of twelve teeth), and a crank position sensor 111 installed adjacent to the timing rotor 107 outputs an electric pulse every time when a tooth passes. Therefore, the crank position sensor 111 can detect the crank shaft angle every 30 degrees.

A projection is formed on an intake cam shaft (not shown) which drives the intake valve 104, and a cam shaft sensor 112 positioned adjacent to the intake cam shaft outputs an electric pulse every time when the projection passes. Thus, the cam shaft sensor 112 makes it possible to detect one turn of the cam shaft, i.e., to detect one cycle of the internal combustion engine.

Moreover, a vibration sensor 113 is attached to the cylinder block 101 to detect vibration produced by the internal combustion engine.

Outputs of the crank position sensor 111, cam shaft sensor 112 and vibration sensor 113 are passed to a controller 12.

The controller 12 is constituted by a microcomputer comprising a CPU 122, a memory 123, an input interface 124 and an output interface 125 with a data bus 121 at the center. Outputs of the sensors are passed to the CPU 122 through the input interface 124.

An ignition command signal is output from the output interface 125 of the controller 12, and is supplied to the ignition plug 106 through an igniter 131 and an ignition coil 132.

Figure 2:
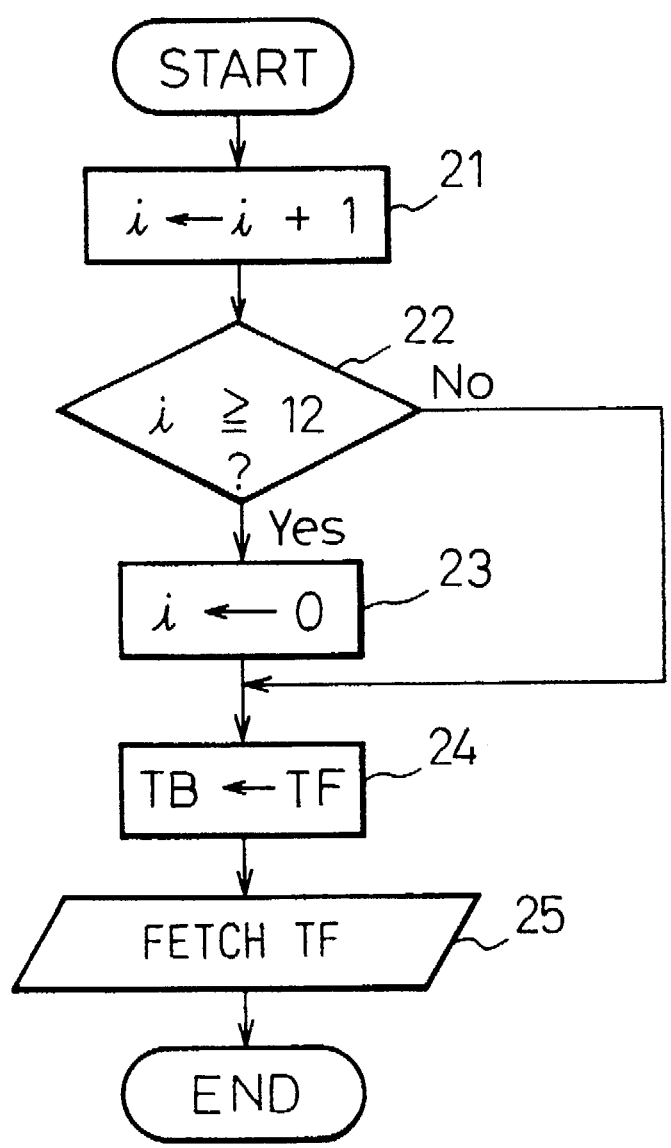
FIG. 2 is a flow chart of a routine for detecting the crank angle.

FIG. 2 is a flow chart of a routine for detecting the crank angle executed by the CPU 122, and is executed as an interrupt process every time a pulse is output from the crank position sensor 111.

At a step 21, an index i which represents the crank angle is increased and at a step 22, it is determined whether the index i has reached 12 or not.

When the determination at the step 22 is affirmative, i.e., when the index i is 12, the index i is then reset at a step 23 and the control proceeds to a step 24.

When the determination at the step 22 is negative, the control proceeds directly to the step 24.

At the step 24, the time TF fetched from a free-run timer when the routine was executed in the previous time is stored in TB and at a step 25, the time TF of the free-run timer is fetched to terminate the routine.

Figure 3:
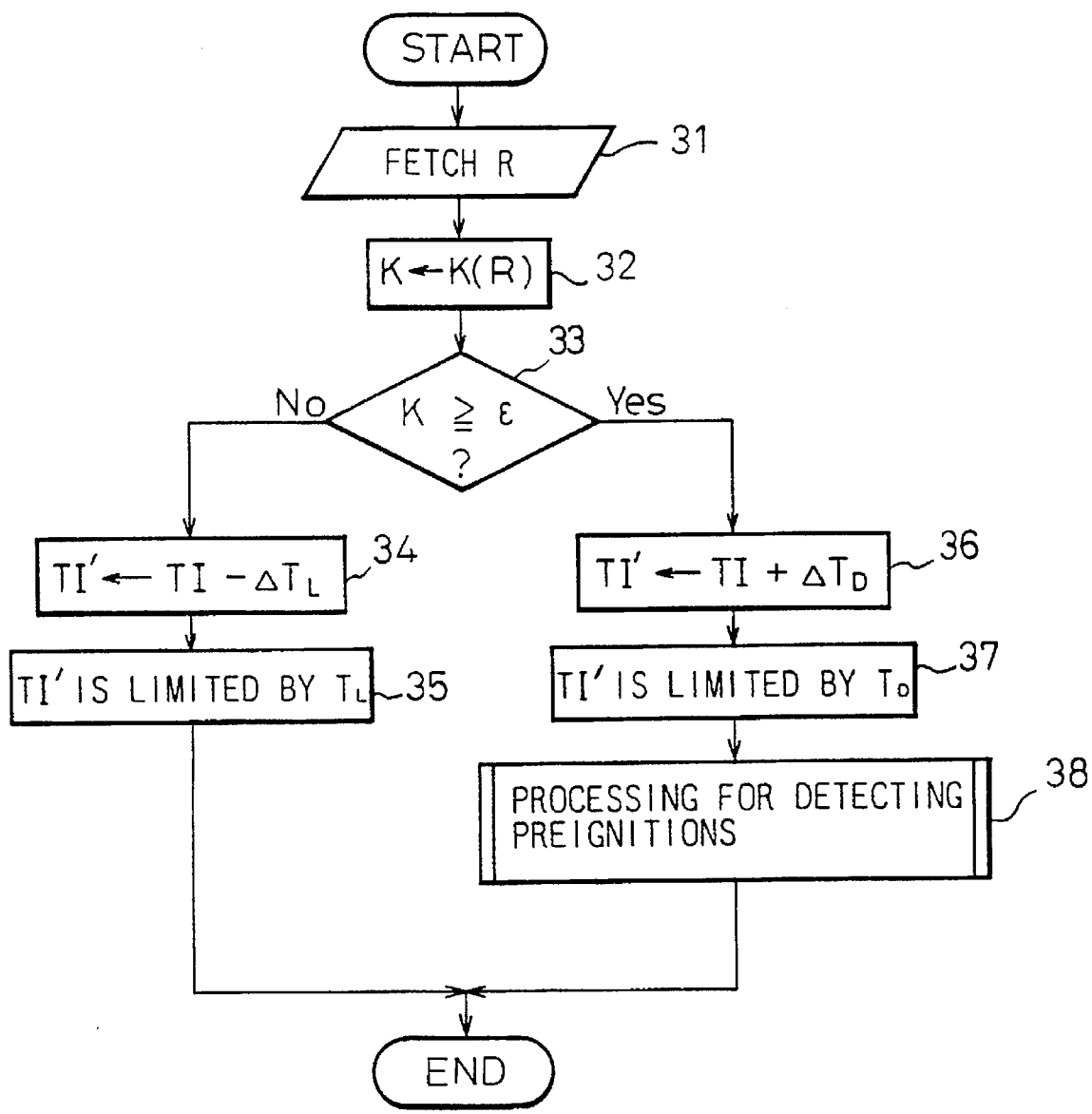
FIG. 3 is a flow chart of a routine for controlling the ignition timing.

FIG. 3 is a flow chart of a routine for controlling the ignition timing executed by the CPU 122 every after a predetermined time interval.

At a step 31, a vibration level R of the internal combustion engine detected by the vibration sensor 113 is fetched and at a step 32, a vibration level K is determined as a function of the vibration level R, i.e., K=K(R).

As this function, a moving average of the vibration level R can be used.

At a step 33, it is determined whether the vibration level K is larger than a predetermined threshold level ε or not.

In the above-mentioned embodiment, whether abnormal vibration is occurring or not is determined depending upon the magnitude of the vibration level K. However, the occurrence of abnormal vibration can be also determined relying upon the frequency of the vibration level K that exceeds a predetermined second threshold value η within a predetermined period of time TP. Here, the second threshold value η may be smaller than the threshold value ε.

When the determination at the step 33 is negative, i.e., when it is so determined that no abnormal vibration is occurring, the control proceeds to a step 34 where a process is executed for advancing the ignition timing.

That is, at the step 34, the ignition timing TT is advanced by subtracting a predetermined advancing angle $\Delta T_L$ from a reference ignition timing TI.

As is well known, the reference ignition timing TI is determined as a function of the engine speed Ne and the intake air flow GN, i.e., TI=TI(Ne, GN)

At a step 35, the ignition timing TT is limited by a maximum advancing timing $T_L$, and the routine is terminated.

When the determination at the step 33 is affirmative, i.e., when it is judged that abnormal vibration is occurring, the control proceeds to a step 36 where the ignition timing TT is delayed by adding a predetermined delaying angle $\Delta T_D$ to the reference ignition timing TI. Here, the predetermined delaying angle $\Delta T_D$ is larger than the predetermined advancing angle $\Delta T_L$ so that abnormal vibration can be quickly suppressed.

At a step 37, the ignition timing TT is limited by a maximum delaying timing $T_D$. The control then proceeds to a step 38 where a processing is executed to detect the preignition, and the routine is terminated.

Figure 4:
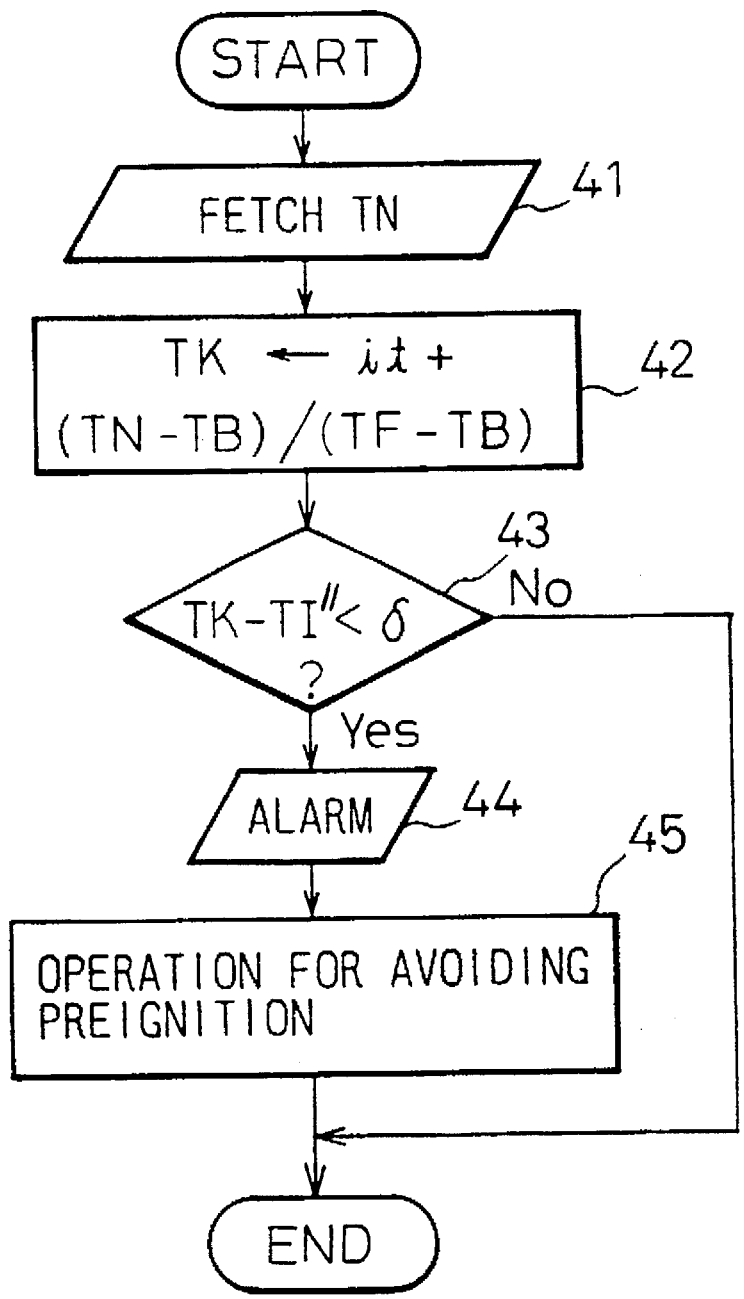
FIG. 4 is a flow chart of a first processing for detecting the preignition.

FIG. 4 is a flowchart of a first process for detecting the preignition which is executed at the step 38 in the routine for controlling the ignition timing of FIG. 3. At a step 41, a time TN, when abnormal vibration is detected, is read out from a free-run timer.

When a condition, in which the vibration level K exceeds the predetermined second threshold value η more than a predetermined number of times within a predetermined period of time, is used as a basis for determining the occurrence of abnormal vibration, the time TN at which abnormal vibration larger than the second threshold value η is detected first within the predetermined period of time TP, is read out from the free-running timer. Here, the time TN at which the vibration is detected may not be the one at which vibration larger than the second threshold value η is detected first within the predetermined period of time TP, but may be the one at which vibration is detected after the preceding vibrations have been detected a plural number of times, e.g., may be the one at which vibration is detected in the second time or the third time.

A step 42 calculates the time TK at which abnormal vibration is detected in compliance with the following equation, $$TK=it+(TN-TB)/(TF-TB)$$

where "it" is a previous time when a pulse from the crank position sensor 111 is detected.

That is, based on a pulse output from the crank position sensor 111, the time is corrected by a ratio of the time up to detecting abnormal vibration to the time between the pulses.

At a step 43, it is determined whether or not a difference between the time TK of detecting abnormal vibration and the time TI" converted from the ignition timing TT using the present engine speed Ne is smaller than the predetermined threshold value δ. The threshold value δ is determined as a positive value. The step 43 may detect a change in the time TK at which abnormal vibration is detected, i.e., may detect whether abnormal vibration is occurring frequently.

When the determination at the step 43 is affirmative, i.e., when the difference between the time TK of detecting abnormal vibration and the reference ignition timing TI is smaller than the predetermined threshold value δ, it is so determined that the preignition has occurred and an alarm is generated at a step 44.

At a step 45, the operation is carried out to avoid preignition, and the routine is then terminated.

The following operations can be carried out to avoid the preignition.

1. Set the ignition timing at a maximum delaying timing $T_D$.
2. Increase the amount of fuel injection to bring the air/fuel ratio to be smaller than or equal to a lower limit of the combustible range.
3. Decrease the amount of fuel injection to bring the air/fuel ratio to be higher than or equal to an upper limit of the combustible range.
4. Close the throttle valve.

That is, according to the first embodiment in which it is determined that the preignition is occurring when the time TK of detecting abnormal vibration is close to the present ignition timing TI, it is allowed to detect the occurrence of preignition at an early time.

The preignition, however, may not be detected at sufficiently high precision depending upon a threshold value with which abnormal vibration is determined or a threshold value of a difference between the time of detecting abnormal vibration and the present ignition timing.

According to a second embodiment, it is so determined that preignition is occurring when the vibration continues to increase despite the ignition timing being delayed to cope with the occurrence of abnormal vibration, in order to enhance the precision of detection.

Figure 5:
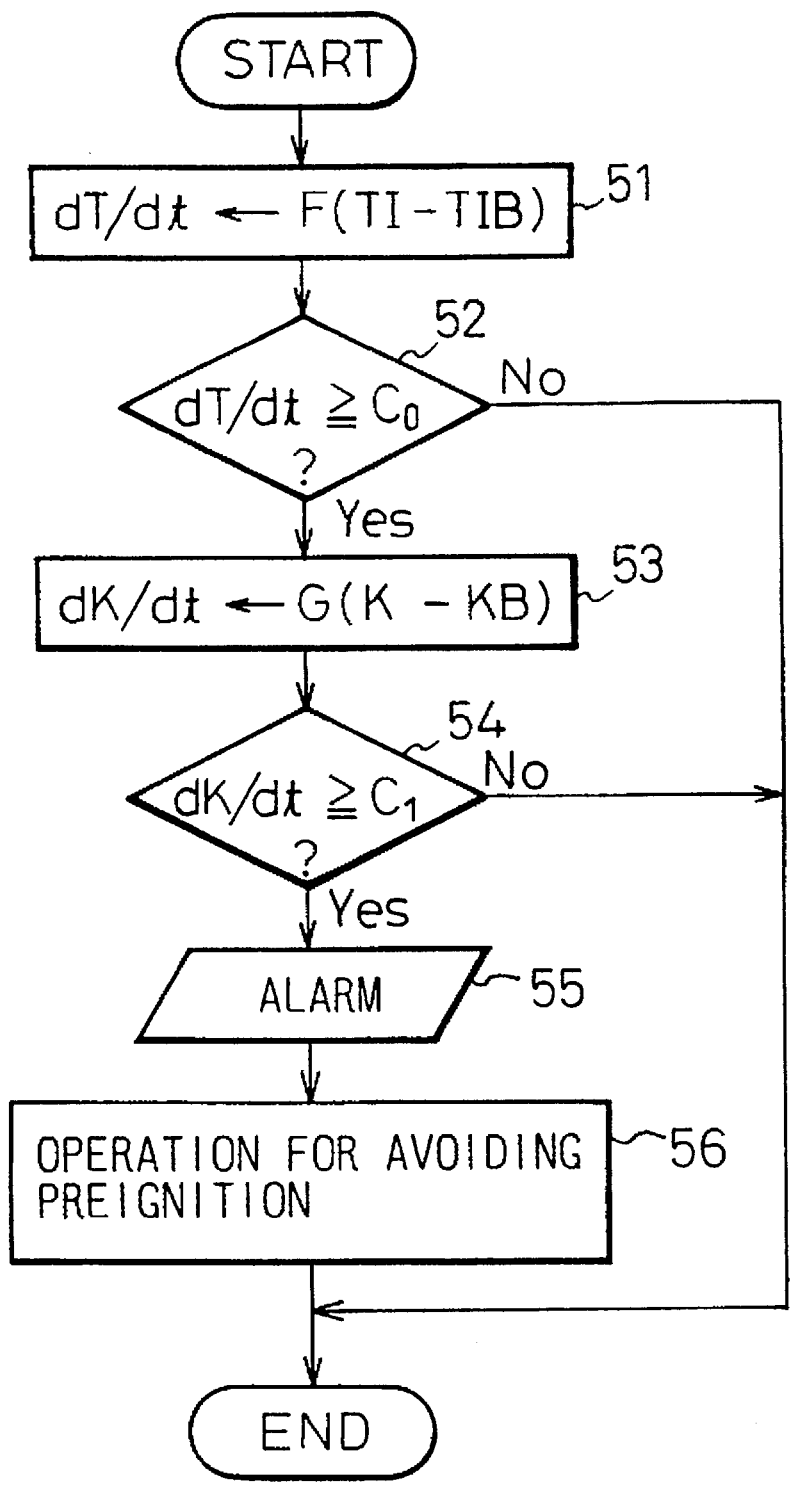
FIG. 5 is a flow chart of a second processing for detecting the preignition.

FIG. 5 is a flow chart of a second process for detecting preignition, wherein a rate of change in the ignition timing dT/dt is calculated at a step 51.

The rate of change in the ignition timing dT/dt can be calculated using, for example, the equation dT/dt=F(TI–TIB) where TIB is the ignition timing of when the routine was executed in the previous time and the function F is a moving average of (TI–TIB).

At a step 52, it is determined whether the rate of change in the ignition timing dT/dt is larger than a predetermined threshold value $C_0$ or not, i.e., whether the ignition timing is being delayed continuously or not.

Figure 6:
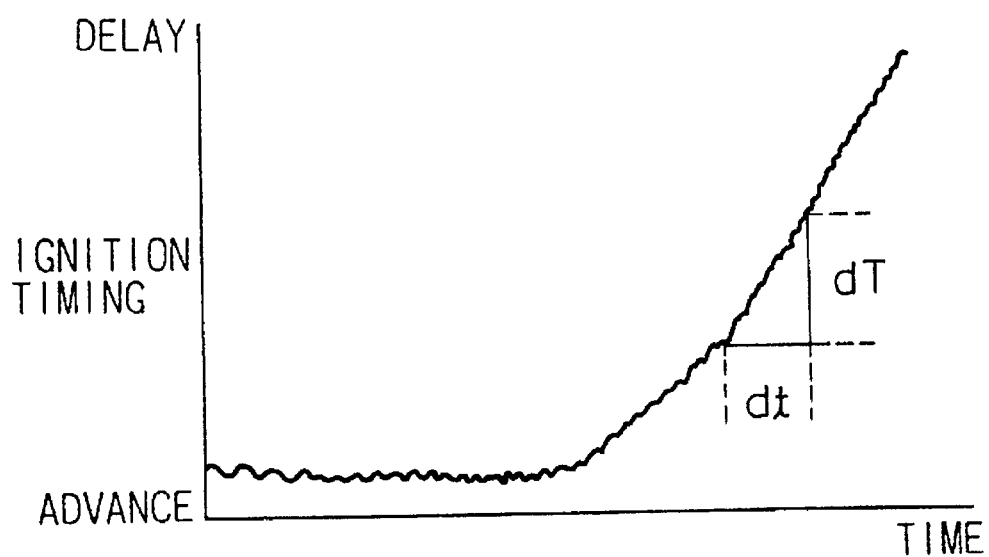
FIG. 6 is a graph showing a change in the ignition timing with the passage of time.

FIG. 6 is a graph showing a change in the ignition timing with the passage of time, wherein the abscissa represents the time and the ordinate represents the ignition timing. The ignition timing is delayed as the ordinate goes up. Here, in practice, the threshold value $C_0$ exhibits a hysteresis characteristic of some width.

When the determination at the step 52 is affirmative, i.e., when it is determined that the ignition timing is being delayed continuously, the control proceeds to a step 53 where a rate of change in the engine vibration level dK/dt is calculated in compliance with, for example, the equation dK/dt=G(K–KB) where KB is the vibration level of the internal combustion engine of when the routine was executed in the previous time, and the function G is a moving average of (K–KB).

At a step 54, it is determined whether the rate of change in the vibration level dK/dt is larger than a predetermined threshold value $C_1$ or not, i.e., whether the vibration of the internal combustion engine is continuing to increase or not.

Figure 7:
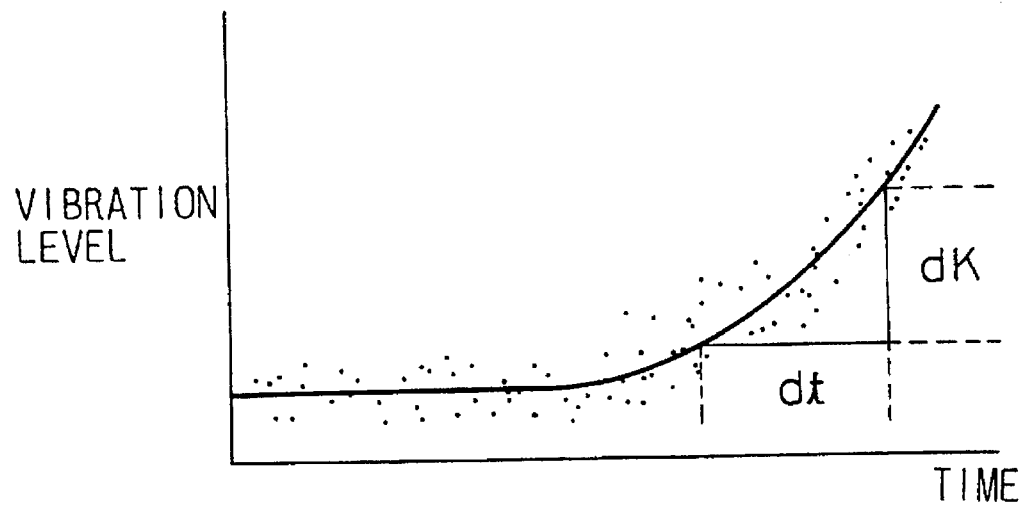
FIG. 7 is a graph showing a change in the vibration level with the passage of time.

FIG. 7 is a graph showing a change in the vibration of the internal combustion engine, wherein the abscissa represents the time and the ordinate represents the vibration level. Here, in practice, the threshold value $C_1$ exhibits hysteresis of some width.

When the determination at the step 54 is affirmative, i.e., when the vibration of the internal combustion engine continues to increase, it is determined that the preignition is occurring and an alarm is generated at a step 55.

At a step 56, the operation is carried out to avoid the occurrence of the above-mentioned preignition, and the routine is terminated.

That is, according to the second embodiment, it is so determined that the preignition is occurring when the rate of change in the ignition timing and vibration becomes greater than the predetermined threshold value despite the operation is carried out to suppress abnormal vibration. It is thus made possible to detect the occurrence of preignition at an early time and reliably.

According to the first and second embodiments, furthermore, the vibration level R must be fetched, at very short time intervals to maintain the precision of detection inevitably causing the CPU 122 to bear a considerably large burden.

Figure 8:
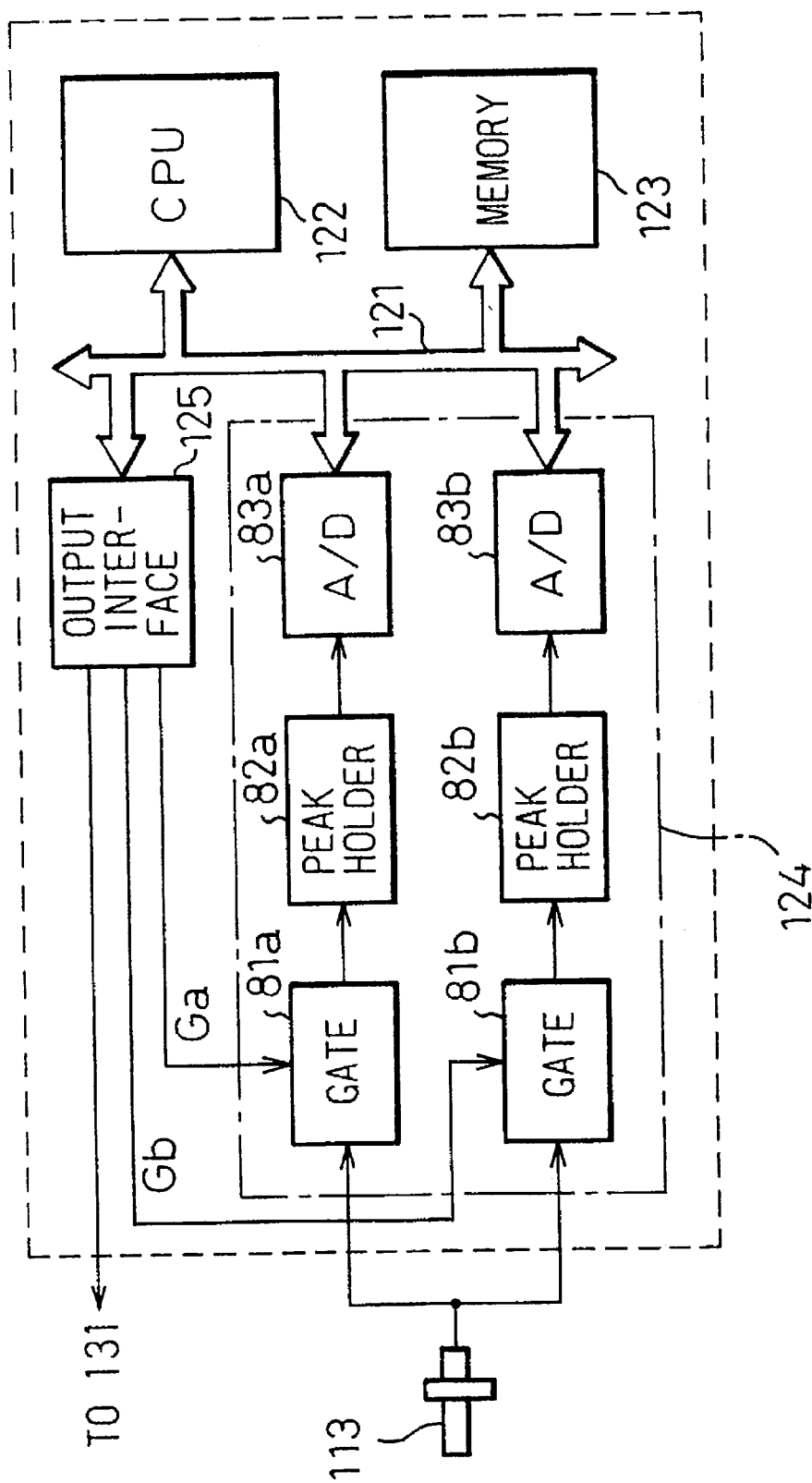
FIG. 8 is a diagram illustrating the constitution of another embodiment.

A third embodiment is to decrease the burden born by the CPU 122. FIG. 8 is a diagram illustrating the constitution according to the third embodiment.

In the third embodiment, a vibration sensor 113 is connected to an input interface 124 which comprises a gate 81*a*, a peak holder 82*a* and an A/D converter 83*a* that are connected in series, and a gate 81*b*, a peak holder 82*b* and an A/D converter 83*b* that are connected in series.

The gates 81*a* and 81*b* are controlled by two gate control signals Ga and Gb output from the output interface 125.

Figure 9:
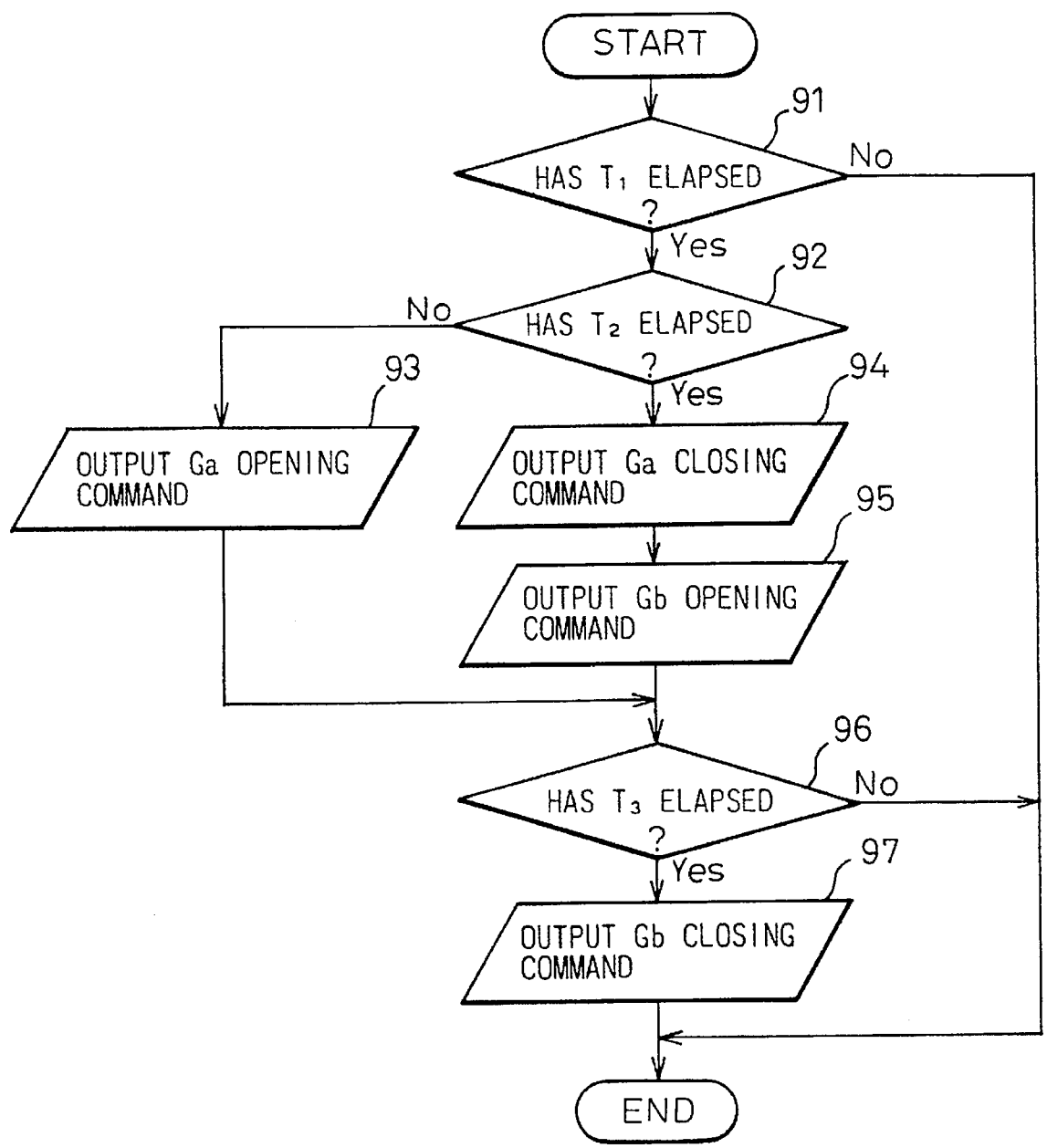
FIG. 9 is a flow chart of a routine for controlling the gate.

FIG. 9 is a flow chart of a gate control routine used in the third embodiment, wherein it is determined at a step 91 whether a first predetermined period of time $T_1$ has passed from the ignition timing TI. Here, the first predetermined period of time $T_1$ (e.g., time until the top dead center is reached after the ignition timing TI) is set to be shorter than a time by which it is expected that the so-called knocking (abnormal vibration of an internal combustion engine which is not preignition) may occur in the internal combustion engine after the ignition timing TI.

When the determination at the step 91 is affirmative, the control proceeds to a step 92 where it is determined whether a second predetermined period of time $T_2$ has passed from the ignition timing TI. The second predetermined period of time $T_2$ is set to be longer than a time by which it is expected that the so-called knocking may occur in the internal combustion engine after the ignition timing TI.

When the determination at the step 92 is negative, the control proceeds to a step 93 where a gate opening command is output to the first gate 81*a*. The control then proceeds to a step 96.

When the determination at the step 92 is affirmative, a step 94 outputs a gate closing command to the first gate 81*a* and a step 95 outputs a gate opening command to the second gate 81*b*. The control then proceeds to a step 96.

At the step 96, it is determined whether a third predetermined period of time $T_3$ has passed from the ignition timing TI. The third predetermined period of time $T_3$ is set to be longer than the second predetermined period of time $T_2$.

When the determination at the step 96 is affirmative, a step 97 outputs a gate closing command to the second gate 81*b* and the routine is terminated. When the determination at the step 91 or at the step 96 is negative, the routine is readily terminated.

According to this gate control routine, a vibration peak $P_1$ detected by the vibration sensor 113 from the first predetermined period of time $T_1$ after the ignition timing TI to the second predetermined period of time $T_2$, is stored in the first peak holder 82*a*, and a vibration peak $P_2$ detected by the vibration sensor 113 from the second predetermined period of time $T_2$ to the third predetermined period of time $T_3$ is stored in the second peak holder 82*b*.

Figure 10:
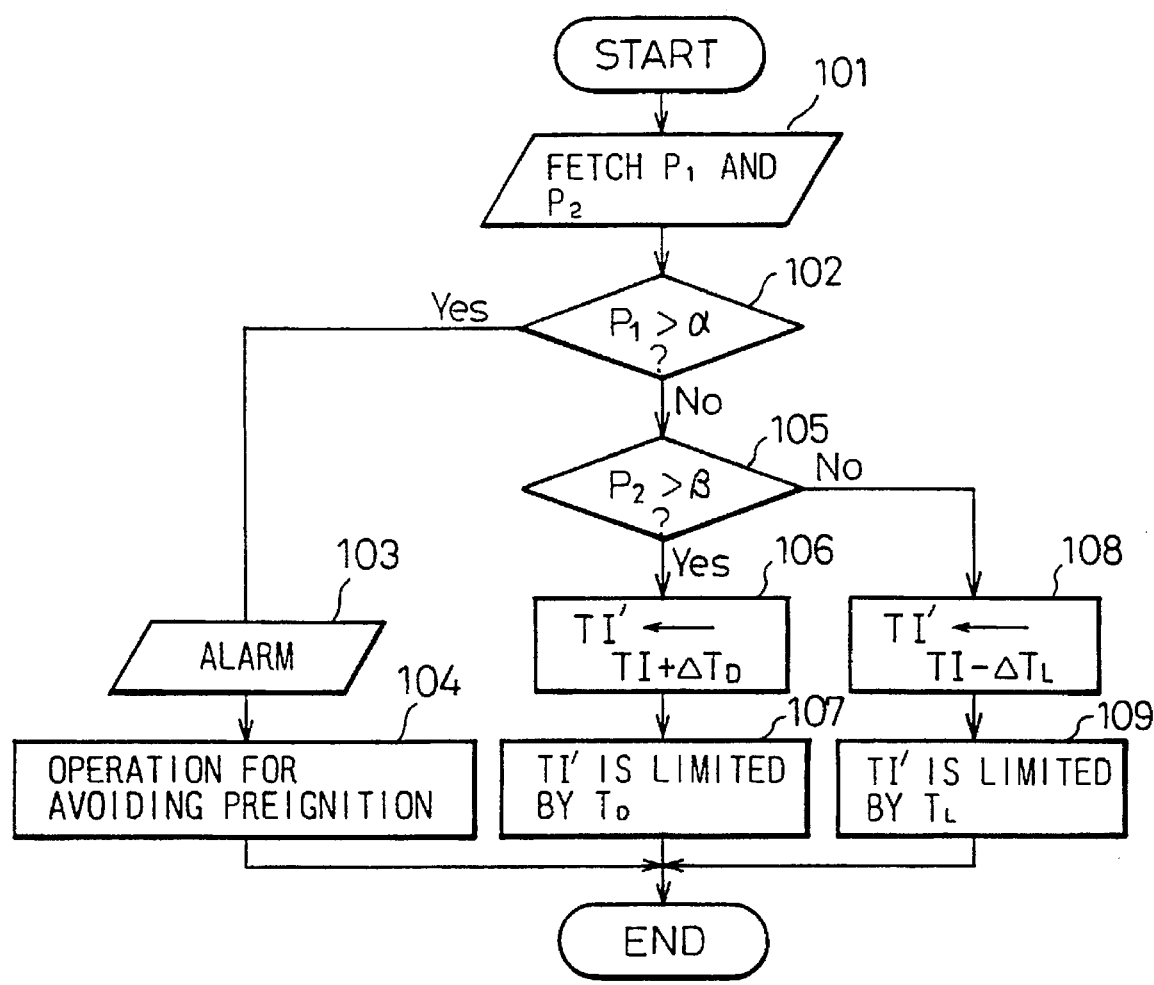
FIG. 10 is a flow chart of a second routine for controlling the ignition timing.

FIG. 10 is a flow chart of a second routine for controlling the ignition timing used in the third embodiment, wherein the first vibration peak $P_1$ stored in the first peak holder 82*a* and the second vibration peak $P_2$ stored in the second peak holder 82*b* are fetched at a step 101.

At a step 102, it is determined whether the first vibration peak $P_1$ is higher than a first predetermined level $\alpha$.

When the determination at the step 102 is affirmative, it is regarded that the preignition is occurring and an alarm is generated at a step 103. Then, at a step 104, the operation is carried out to avoid the occurrence of preignition, and the routine is terminated.

When the determination at the step 102 is negative, the control proceeds to a step 105 where it is determined whether the second vibration peak $P_2$ is higher than a predetermined second level $\beta$.

When the termination at the step 105 is affirmative, it is regarded that the so-called knocking is occurring, and the control proceeds to a step 106 where the predetermined delay angle $\Delta T_D$ is added to the reference ignition timing TI to get a delayed ignition timing TI'.

At a step 107, the delayed ignition timing TI' is limited by the maximum delaying time $T_D$, and the routine is terminated.

When the determination at the step 105 is negative, it is regarded that abnormal vibration (preignition and knocking) is not occurring, and the control proceeds to a step 108 where a predetermined advance angle $\Delta T_L$ is subtracted from the reference ignition timing TI to get an advanced ignition timing.

At a step 109, the advanced ignition timing TT is limited by the maximum advancing timing $T_L$, and the routine is finished.

It is desired that the first predetermined level $\alpha$ is set to be higher than the second predetermined level $\beta$, i.e., $\alpha > \beta$. This is because, the intensity of vibration due to the preignition is larger than the intensity of vibration due to knocking.

Figure 11:
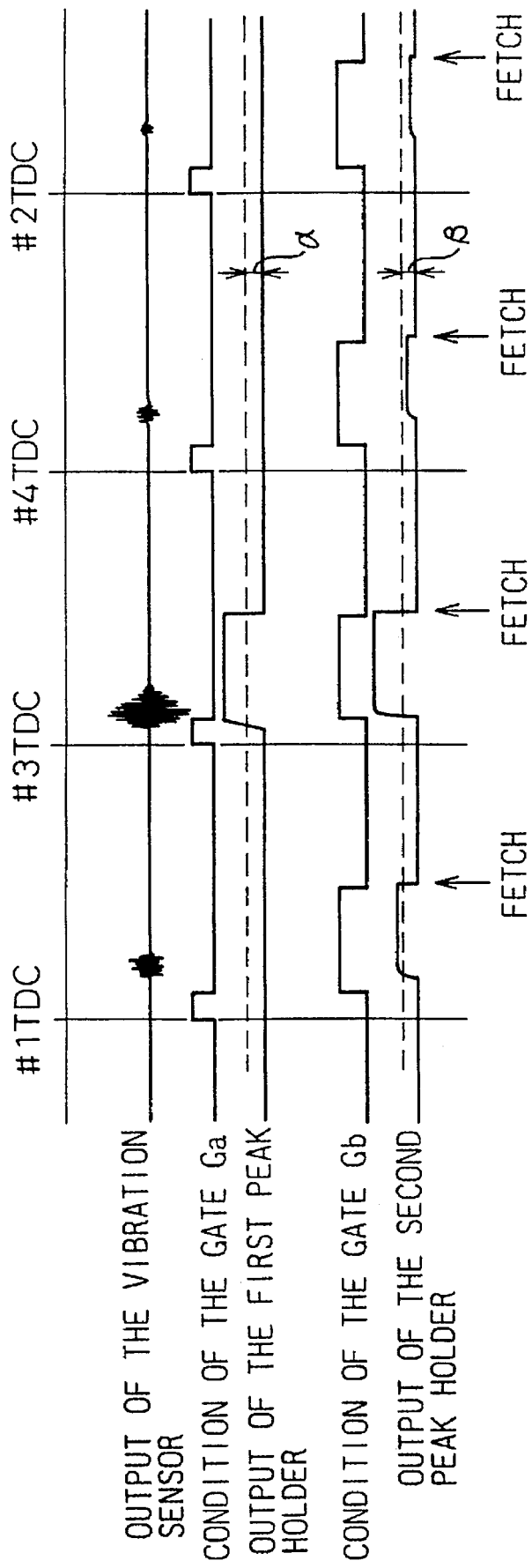
FIG. 11 is a timing diagram of another embodiment.

FIG. 11 is a timing diagram for explaining the operation of the third embodiment, wherein the abscissa represents the time and the ordinate represents, downward in the order mentioned, output of the vibration sensor, output of the first gate Ga, output of the first peak holder, output of the second gate Gb and output of the second peak holder. That is, FIG. 10 shows a case where the preignition is occurring in the #3 cylinder.

According to the third embodiment, a decreased amount of load is born by the CPU since the vibration peak may be fetched after the top dead center is reached in a given cylinder until the top dead center is reached in the next cylinder.

In order to detect the condition where preignition may occur in the internal combustion engine, the engine may often be provided with a cylinder pressure sensor or an ion sensor for detecting flame relying upon the presence of ions for each of the cylinders. However, providing the sensors for each of the cylinders is disadvantageous in economy and in mounting technique. Besides, ion sensors can detect hot spots only that exist near the sensors.

The preignition detecting system of the present invention, however, is capable of quickly detecting the preignition without requiring any additional sensors.

According to the preignition detecting system of the first aspect of the invention, it is so determined that the preignition is occurring when a difference between the knocking timing and the ignition timing becomes smaller than a predetermined value. Therefore, the preignition is reliably detected without using any additional sensors.

According to the preignition detecting system of the second aspect of the invention, it is so determined that the preignition is occurring when the vibration of the internal combustion engine continues to increase despite the ignition timing is being delayed continuously, making it possible to detect the preignition quickly and reliably.

According to the preignition detecting system of the third aspect of the invention, the CPU bears a decreased burden, since the peak of vibration needs to be fetched after the top dead center in a given cylinder until the top dead center in the next cylinder.

According to the preignition detecting system of the fourth aspect of the invention, the level for determining the preignition is set to be higher than the level for determining the knocking, so that the preignition can be accurately detected.

We claim:

1. A preignition detecting system comprising:

ignition timing control means for determining an ignition timing depending upon the conditions in which an internal combustion engine is operating;

abnormal vibration determining means for determining that abnormal vibration is occurring when a vibration component within a predetermined frequency range as a result of detecting vibration of the internal combustion engine is larger than a predetermined level or when vibration within a predetermined frequency range occurs more often than a predetermined frequency after the ignition is effected by said ignition timing control means;

abnormal vibration timing detecting means for detecting a timing at which it is determined by said abnormal vibration determining means that abnormal vibration is occurring; and a preignition determining means for so determining that preignition is occurring depending upon a time difference between the ignition timing determined by said ignition timing control means and the timing of abnormal vibration detected by said abnormal vibration timing detecting means.

2. A preignition detecting system comprising:

ignition timing control means for determining an ignition timing depending upon the conditions in which an internal combustion engine is operating;

abnormal vibration determining means for so determining that abnormal vibration is occurring when a vibration component within a predetermined frequency range, as a result of detecting vibration of the internal combustion engine, is larger than a predetermined level or when vibration within a predetermined frequency range occurs more often than a predetermined frequency after the ignition is effected by said ignition timing control means;

delay angle correction means for delaying the ignition timing determined by said ignition timing control means when it is determined by said abnormal vibration determining means that abnormal vibration is occurring;

continuation-of-delay determining means for determining whether or not the ignition timing is being continuously delayed by said delay angle correction means;

abnormal vibration increment determining means for determining whether or not abnormal vibration is increasing based upon a vibration component within a predetermined frequency range when it is determined by said abnormal vibration determining means that abnormal vibration is occurring; and preignition determining means for so determining that preignition is occurring when it is determined by said continuation-of-delay determining means that the ignition timing is being continuously delayed and when it is determined by said abnormal vibration increment determining means that abnormal vibration is increasing.

3. A preignition detecting system according to claim 1, wherein said abnormal vibration timing detecting means comprises:

first abnormal vibration detecting means which detects that said abnormal vibration determining means has determined the occurrence of vibration larger than a predetermined threshold level after the passage of a first predetermined period of time from the ignition effected by said ignition timing control means; and second abnormal vibration detecting means which detects that said abnormal vibration determining means has determined the occurrence of vibration larger than a predetermined threshold level after the passage of a second predetermined period of time longer than said first predetermined period of time from the ignition effected by said ignition timing control means; and wherein said preignition determining means so determines that preignition is occurring when it is determined by said first abnormal vibration detecting means that abnormal vibration is occurring.

4. A preignition detecting system according to claim 3, wherein said first abnormal vibration detecting means so determines that abnormal vibration is occurring when vibration larger than a predetermined first threshold level is being generated, and said second abnormal vibration detecting means so determines that abnormal vibration is occurring when vibration larger than a predetermined second threshold level which is lower than said first threshold level is being generated.

5. A preignition detecting method comprising steps of:

ignition timing control step for determining an ignition timing depending upon the conditions in which an internal combustion engine is operating;

abnormal vibration determining step for determining that abnormal vibration is occurring when a vibration component within a predetermined frequency range as a result of detecting vibration of the internal combustion engine is larger than a predetermined level or when vibration within a predetermined frequency range occurs more often than a predetermined frequency after the ignition is effected at said ignition timing control step;

abnormal vibration timing detecting step for detecting a timing at which it is determined at said abnormal vibration determining step that abnormal vibration is occurring; and a preignition determining step for so determining that preignition is occurring depending upon a time difference between the ignition timing determined at said ignition timing control step and the timing of abnormal vibration detected at said abnormal vibration timing detecting step.

6. A preignition detecting method comprising steps of:

ignition timing control step for determining an ignition timing depending upon the conditions in which an internal combustion engine is operating;

abnormal vibration determining step for so determining that abnormal vibration is occurring when a vibration component within a predetermined frequency range, as a result of detecting vibration of the internal combustion engine, is larger than a predetermined level or when vibration within a predetermined frequency range occurs more often than a predetermined frequency after the ignition is effected at said ignition timing control step;

delay angle correction means for delaying the ignition timing determined said ignition timing control step when it is determined at said abnormal vibration determining step that abnormal vibration is occurring;

continuation-of-delay determining step for determining whether or not the ignition timing is being continuously delayed at said delay angle correction step;

abnormal vibration increment determining step for determining whether or not abnormal vibration is increasing based upon a vibration component within a predetermined frequency range when it is determined at said abnormal vibration determining step that abnormal vibration is occurring; and preignition determining step for so determining that preignition is occurring when it is determined at said continuation-of-delay determining step that the ignition timing is being continuously delayed and when it is determined at said abnormal vibration increment determining step that abnormal vibration is increasing.

7. A preignition detecting method according to claim 5, wherein said abnormal vibration timing detecting step comprises steps of:

first abnormal vibration detecting step which detects that said abnormal vibration determining step has determined the occurrence of vibration larger than a predetermined threshold level after the passage of a first predetermined period of time from the ignition effected at said ignition timing control step; and second abnormal vibration detecting step which detects that said abnormal vibration determining means has determined the occurrence of vibration larger than a predetermined threshold level after the passage of a second predetermined period of time longer than said first predetermined period of time from the ignition effected at said ignition timing control step; and wherein said preignition determining step so determines that preignition is occurring when it is determined at said first abnormal vibration detecting step that abnormal vibration is occurring.

8. A preignition detecting method according to claim 7, wherein said first abnormal vibration detecting step so determines that abnormal vibration is occurring when vibration larger than a predetermined first threshold level is being generated, and said second abnormal vibration detecting step so determines that abnormal vibration is occurring when vibration larger than a predetermined second threshold level which is lower than said first threshold level is being generated.

* * * * *